United States Patent
Fu et al.

(10) Patent No.: US 11,898,901 B2
(45) Date of Patent: Feb. 13, 2024

(54) METHOD AND SYSTEM FOR MAPPING FIBER OPTIC DISTRIBUTED ACOUSTIC SENSING MEASUREMENTS TO PARTICLE MOTION

(71) Applicant: ARAMCO SERVICES COMPANY, Houston, TX (US)

(72) Inventors: Lei Fu, Houston, TX (US); Weichang Li, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/804,511

(22) Filed: May 27, 2022

(65) Prior Publication Data

US 2023/0408327 A1 Dec. 21, 2023

(51) Int. Cl.
| | | |
|---|---|---|
| *G06N 3/044* | (2023.01) | |
| *G01H 9/00* | (2006.01) | |
| *G01V 1/22* | (2006.01) | |
| *G01V 1/30* | (2006.01) | |
| *G01V 1/28* | (2006.01) | |

(52) U.S. Cl.
CPC ............. *G01H 9/004* (2013.01); *G01V 1/226* (2013.01); *G01V 1/288* (2013.01); *G01V 1/307* (2013.01); *G06N 3/044* (2023.01)

(58) Field of Classification Search
CPC ........ G01H 9/004; G01V 1/226; G01V 1/288; G01V 1/307; G01N 3/044
See application file for complete search history.

(56) References Cited

U.S. PATENT DOCUMENTS

2020/0081145 A1   3/2020 Padhi et al.

FOREIGN PATENT DOCUMENTS

| CN | 110058305 A | 7/2019 |
|---|---|---|
| WO | 2020242448 A1 | 12/2020 |

OTHER PUBLICATIONS

Wamriew et al., Deep Neural Networks for Detection and Location of Microseismic Events and Velocity Model Inversion from Microseismic Data Acquired by Distributed Acoustic Sensing Array, Oct. 5, 2021, Sensors 2021, 21, 6627, 17 pp. (Year: 2021).*
Daley et al.; "Field testing of fiber-optic distributed acoustic sensing (DAS) for subsurface seismic monitoring", The Leading Edge; vol. 32; Issue 6; Jun. 1, 2013; pp. 699-706 (7 pages).

(Continued)

*Primary Examiner* — Toan M Le
(74) *Attorney, Agent, or Firm* — Osha Bergman Watanabe & Burton LLP

(57) ABSTRACT

A method for mapping fiber optic distributed acoustic sensing (DAS) measurements to particle motion involves obtaining, from a fiber optic DAS system in a wellbore, a first set of DAS data associated with a first seismic wave; obtaining, from a discrete seismic receiver in the wellbore, measured particle motion data associated with the first seismic wave; generating training data from the first set of DAS data and the measured particle motion data; training a machine learning model using the training data; obtaining a second set of DAS data associated with a second seismic wave; and determining a predicted particle motion in response to the second seismic wave using the machine learning model applied to the second set of DAS data.

20 Claims, 8 Drawing Sheets

(56) References Cited

OTHER PUBLICATIONS

T.M. Daley et al.; "Field testing of modular borehole monitoring with simultaneous distributed acoustic sensing and geophone vertical seismic profiles at Citronelle, Alabama", Geophysical Prospecting; vol. 64; Issue 5; Nov. 2, 2015; pp. 1318-1334 (17 pages).
A. Ellmauthaler et al.; "Real-Time DAS VSP Acquisition and Processing on Single- and Multi-Mode Fibers", IEEE Sensors Journal; vol. 21; Issue 13; Jul. 1, 2021; pp. 14847-14852 (6 pages).
Hall et al.; "Comparison of multi-component seismic date to fibre-optic (DAS) data", SEG Technical Program Expanded Abstracts 2020; Sep. 30, 2020; pp. 525-529 (5 pages).
K. Soga and L. Luo; "Distributed fiber optics sensors for civil engineering infrastructure sensing", Journal Of Structural Integrity And Maintenance; vol. 3; No. 1; Feb. 21, 2018; pp. 1-21 (21 pages).
K. T. Spikes et al.; "Comparison of geophone and surface-deployed distributed acoustic sensing seismic data", Geophysics; vol. 84; Issue 2; Feb. 13, 2019; pp. A25-A29 (5 pages).
H. Merry et al.; "Optimizing distributed acoustic sensing (DAS) acquisition: Test well design and automated data analysis", SEG-2020-3419338; SEG International Exposition and Annual Meeting; Oct. 11, 2020; pp. 520-524 (5 pages).

\* cited by examiner

METHOD AND SYSTEM FOR MAPPING FIBER OPTIC DISTRIBUTED ACOUSTIC SENSING MEASUREMENTS TO PARTICLE MOTION

BACKGROUND

In the oil & gas and mining industries, seismic data measured at the surface is the primary way to estimate subsurface properties and structure. With conventional seismic acquisition, the seismic data recorded on the surface is often contaminated due to the complexity and the dissipative nature of the near-surface. The deployment of downhole sensors can alleviate these limitations at the expense of limiting the subsurface volume that is well illuminated by the data. Real-world application of downhole seismic logging is relatively rare, often only temporary, and even when it is performed, the extent and density of the downhole array are limited due to cost and installation complexity. In contrast, Distributed Acoustic Sensing (DAS) using fiber-optic cables offers both high spatial and temporal resolution, thus offering an alternative sensing technology that may potentially overcome the limitations associated with seismometers. It has rapidly gained popularity in the past decade.

Well-established methods exist for downstream processing of data acquired using discrete seismic receivers, such as geophones. It may be beneficial to use such methods for DAS data as well. In view of the above, it would be desirable to translate DAS data to particle motion data of discrete seismic receivers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for mapping fiber optic distributed acoustic sensing (DAS) measurements to particle motion, the method comprising: obtaining, from a fiber optic DAS system in a wellbore, a first set of DAS data associated with a first seismic wave; obtaining, from a discrete seismic receiver in the wellbore, measured particle motion data associated with the first seismic wave; generating training data from the first set of DAS data and the measured particle motion data; training a machine learning model using the training data; obtaining a second set of DAS data associated with a second seismic wave; and determining a predicted particle motion in response to the second seismic wave using the machine learning model applied to the second set of DAS data.

In general, in one aspect, embodiments relate to a system for mapping fiber optic distributed acoustic sensing (DAS) measurements to particle motion, the system comprising: a seismic data processing system configured to: obtain, from a fiber optic DAS system in a wellbore, a first set of DAS data associated with a first seismic wave; obtain, from a discrete seismic receiver in the wellbore, measured particle motion data associated with the first seismic wave; generate training data from the first set of DAS data and the measured particle motion data; train a machine learning model using the training data; obtain a second set of DAS data associated with a second seismic wave; and determine a predicted particle motion in response to the second seismic wave using the machine learning model applied to the second set of DAS data.

In general, in one aspect, embodiments relate to a non-transitory machine-readable medium comprising a plurality of machine-readable instructions executed by one or more processors, the plurality of machine-readable instructions causing the one or more processors to perform operations comprising: obtaining, from a fiber optic distributed acoustic sensing (DAS) system in a wellbore, a first set of DAS data associated with a first seismic wave; obtaining, from a discrete seismic receiver in the wellbore, measured particle motion data associated with the first seismic wave; generating training data from the first set of DAS data and the measured particle motion data; training a machine learning model using the training data; obtaining a second set of DAS data associated with a second seismic wave; and determining a predicted particle motion in response to the second seismic wave using the machine learning model applied to the second set of DAS data.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
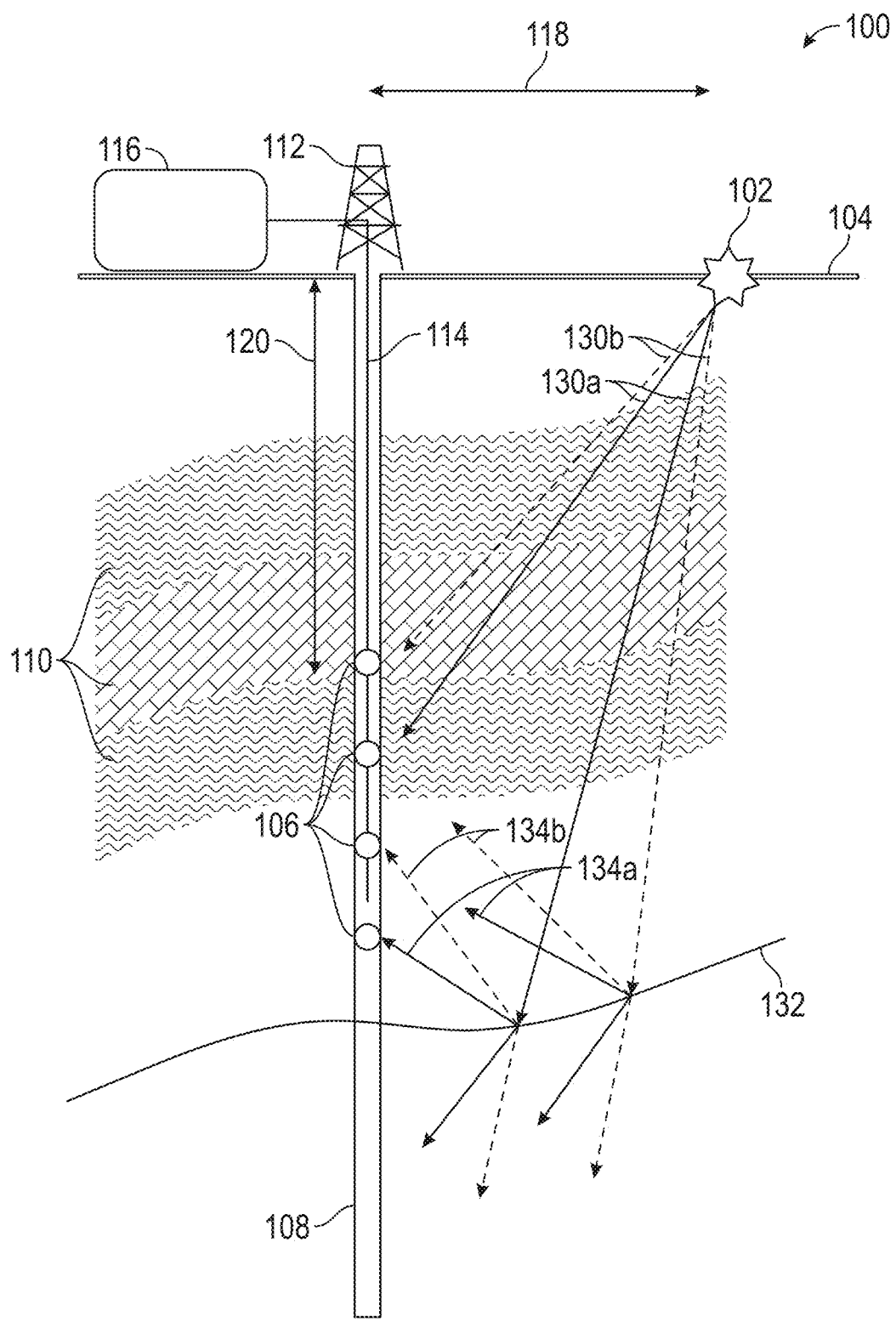
FIG. 1 shows a configuration of a borehole seismic survey utilizing a set of discrete seismic receivers, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for mapping fiber optic distributed acoustic sensing measurements to particle motion.

Distributed acoustic sensing (DAS) uses fiber optic cable to collect acoustic data. Pulses of light are sent down the fiber optic cable and then bounce back to the sensor. Acoustic events disturb the fiber optic cable and cause variation in the return signal, known as "backscatter." The backscatter pattern can be analyzed and interpreted to turn light information back into acoustic information. Accordingly, DAS may be used to gather seismic data.

Seismic data may also be acquired using discrete sensors such as geophones (measuring particle motion (e.g., velocity and/or acceleration)) and/or hydrophones (measuring pressure fluctuations). Well-established methods for downstream processing of recordings obtained using discrete sensors exist.

However, due to the differences in the operating principles of DAS sensing and geophone sensing systems, the responses to seismic wavefields are different. Accordingly, DAS data may not be interpreted in the same manner as geophone data. Directly taking fiber optic DAS data to apply data processing, imaging and inversion as one would do with geophone data may, thus, provide erroneous results.

One or more embodiments of the disclosure translate DAS data to data as it may be obtained using discrete sensors such as geophones, hydrophones, etc. Accordingly, after translation, DAS data may be used as input to the seismic processing/imaging/inversion workflow as it is commonly applied to geophone and/or hydrophone data. Advantages of using DAS sensing in addition to geophone sensing include, for example, the high signal-to-noise ratio (SNR) associated with DAS sensing, a coverage with a relatively high spatial sampling resolution (in comparison to the lower spatial resolution provide by a set of geophones) over potentially long distances (depending on the length of the fiber optic cable). Accordingly, the translated DAS data may be treated similar to geophone data although with the additional potential benefits of a higher spatial sample resolution and/or larger coverage. Embodiments of the disclosure rely on a machine learning based approach to convert DAS measurement to geophone data in a way that may accurately and robustly capture the wavefield characteristics but with enhanced spatial resolution and coverage, and can be directly included in the seismic processing, imaging, and/or inversion workflow. Additional advantages may be that fiber optic cables, in comparison to geophones, are considered cost-effective, and that fiber optic cables tend to be highly resistant to temperature and pressure and may operate for years and even decades. Also, fiber optic cables are considered non-toxic and may thus be abandoned or left inactive in a borehole after use. A detailed description is subsequently provided.

Turning to FIG. 1, a configuration of a borehole seismic survey (100) utilizing a set of discrete seismic receivers, in accordance with one or more embodiments, is shown. The configuration (100) may be used to acquire, for example, vertical seismic profiles (VSPs). VSPs are frequently acquired by engineers and geoscientists in the oil and gas industry to characterize and image reservoir structures in the vicinity of a wellbore and/or to convert surface seismic data acquired over the reservoirs from seismic recording time to depth below the surface.

Unlike surface seismic datasets which are acquired using a set of seismic sources and seismic receivers located on the earth's surface, a borehole seismic survey may have one or more seismic source (102) at the surface (104) and a set of discrete seismic receivers (106) located in a wellbore (108) that may penetrate multiple geological layers (110) in the subsurface region of interest. The discrete seismic receivers (106) may be suspended from a derrick (112) or a crane (not shown) using a means of conveyance (114). The means of conveyance may be a wireline cable, fiber optic cable, coil tubing, drill pipe, wired drill pipe, or any other conveyance mechanism as would be understood by one of ordinary skill in the art. In addition to providing mechanical support to the discrete seismic receivers (106) in the wellbore (108), the means of conveyance (114) may provide electrical power to the discrete seismic receivers (106) and/or transmit data recorded by the discrete seismic receivers (106) to a recording facility (116) on the surface (104). In operation on land, the recording facility (116) may be mounted in a truck. In operation at sea, the recording facility (116) may be part of a drilling rig, production platform, or ship (not shown). When the discrete seismic receivers (106) are deployed into the wellbore (108), the length of cable unspooled may be monitored, thus the depth of each of the discrete seismic receivers (106) may be known at any time with a high level of certainty. In particular, the depth of each of the discrete seismic receivers (106) may be known at the time at which a VSP dataset is recorded with a high level of certainty. Frequently, seismic sources (102) may be located at a distance (118) from the derrick (112) or crane, and the discrete seismic receivers (106) may be located at a depth (120). Often the depth (120) is much greater than the distance (118), but this may not always be the case.

When the seismic source (102) is excited, seismic waves (130a, 130b) radiate from the seismic source (102) and may propagate from the seismic source (102) directly to the discrete seismic receivers (106) where they are recorded. In addition, seismic waves may be reflected from geological discontinuities (132) and these reflected seismic waves (134a, 134b) may also be recorded by the discrete seismic receivers (106). Some of the seismic waves radiating away from the seismic source may be primary waves (P-waves) (130a) which propagate through compression, and others may be secondary waves (S-waves) (130b) which propagate through shear. Seismic P-waves (130a) incident on the geological discontinuity (132) may be reflected as P-waves (134a) or may be reflected as S-waves (134b). Similarly, seismic S-waves (130b) incident on the geological discontinuity (132) may be reflected as P-waves (134a) or may be reflected as S-waves (134b).

A discrete seismic receiver, e.g., a geophone, measures the particle velocity v at a local point, which can be formulated as $$v = \frac{\partial u}{\partial t},$$

where u is the particle displacement at time t. Accordingly, each discrete seismic receiver (106) may register and record the vibrations caused by seismic waves as a time series or "trace". Each sample of the trace records the amplitude of the vibration caused by seismic waves at the time the sample is taken. The amplitudes may have positive or negative values at different times along the trace. A multicomponent discrete seismic receiver records one trace for each component. Thus, a three-component discrete seismic receiver will produce three traces each measuring displacement in a mutually perpendicular direction.

Figure 2A:
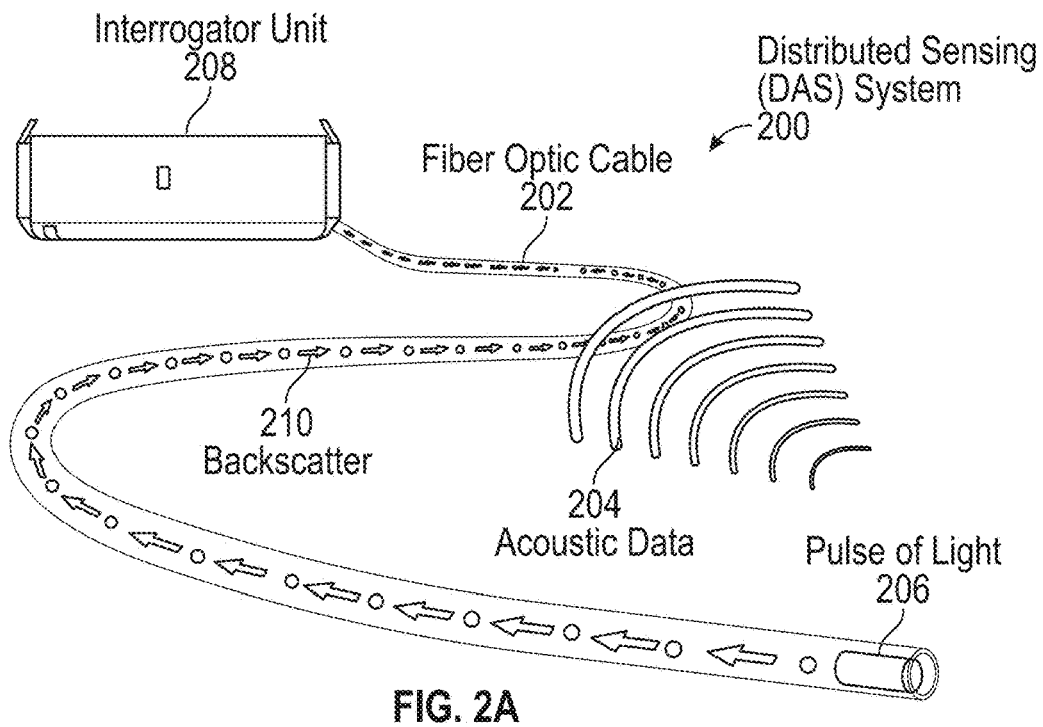
FIG. 2A shows a system for distributed acoustic sensing (DAS), in accordance with one or more embodiments.

Turning to FIG. 2A, a system for distributed acoustic sensing (DAS), in accordance with one or more embodiments, is shown. The fiber optic DAS system (200) uses fiber optic cable (202) to collect acoustic data (204) along the cable. The fiber optic cable is interrogated by a light source (e.g., a laser). An interrogator unit (208) sends pulses of light (206) down the fiber optic cable (202). A small amount of the light is backscattered to the interrogator unit (208) from microheterogeneities naturally present in the fiber. Acoustic events disturb the fiber optic cable and cause variation in the backscatter (210). The backscatter (210) can be analyzed and interpreted to turn light information back into acoustic information. Specifically, the interrogator unit (208) may measure the changes in the backscatter (210) (amplitude, delay, and/or phase, etc.) caused by deformation or strain in response to impinging seismic waves coupled into the fiber optic cable (202). As such, DAS data is a measurement of the fiber strain rate $$\frac{\partial}{\partial t}\left(\frac{\partial u}{\partial z}\right).$$

DAS data may be obtained for multiple DAS channels. Each DAS channel may provide measurements at different spatial sampling points along the fiber optic cable (202), e.g., different depth points if deployed vertically. Waveforms obtained at each channel are a result of strains measured over a spatial distance, i.e., they are not point measurements. This distance is commonly referred to as gauge length. Channel spacing may be as small as, for example, 25 cm (as it only needs to be longer than the spatial duration of the laser pulse), whereas gauge length needs to be long enough (typically ≥8 meters, for example) to ensure an acceptable signal-to-noise ratio (SNR). Accordingly, DAS may be used to gather seismic data. Newly installed or existing fiber optic cable, such as a cable already in place for telecommunications, may be used. The fiber optic DAS system (200) requires limited power (to send and return the light signal) and is not subject to electromagnetic (EM) or radiofrequency (RF) interference.

Figure 2B:
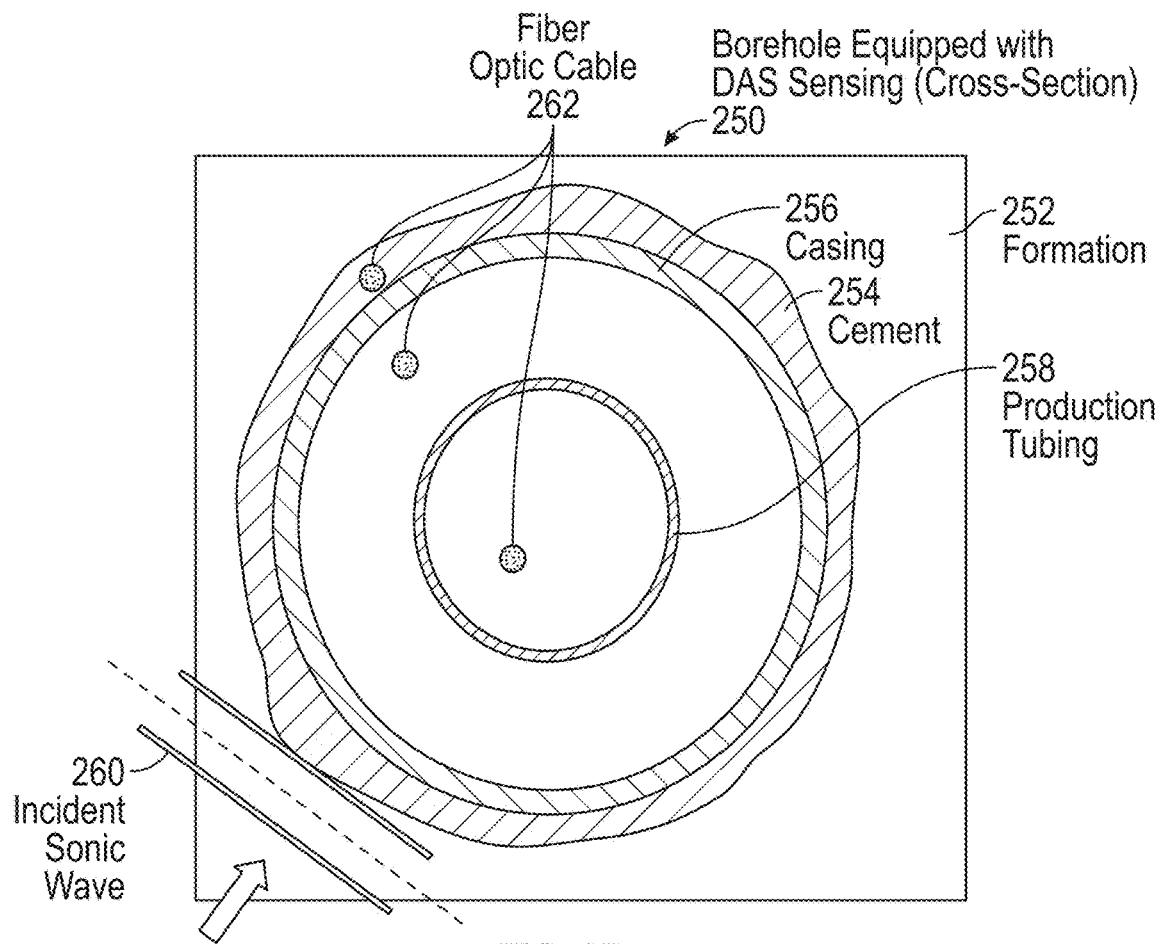
FIG. 2B shows an example of a fiber optic DAS system deployment, in accordance with one or more embodiments.

Turning to FIG. 2B, an example of a fiber optic DAS system deployment, in accordance with one or more embodiments, is shown. Specifically, FIG. 2B shows a cross-section of a borehole (250) equipped with DAS sensing. The borehole penetrates a formation (252). Production tubing (258) is present in the borehole (250) surrounded by casing (256) in cement (254). Fiber optic cable (262) may be installed at various locations in the borehole (250) The small diameter of the fiber optic cable (262), e.g., ¼ inch or less, allows for deployment of the fiber optic cable (262) either inside or behind production tubing (258) or the drill string (not shown), or cemented permanently outside the casing (256) in the cement (254).

If multiple fiber optic cables (262) are distributed at different radii and azimuths of the borehole (250), the configuration may be used to determine an arrival direction of an incident sonic wave (260), e.g., based on timing.

Multiple locations within the cross-section of the borehole (250) may also be obtained by coiling the fiber optic cable (262) around the circumference of the borehole, or around a structure within the borehole (250), such as the casing (256), or the production tubing (258), in a helical manner. Although a helix may only pass through a cross-section of the borehole (250) at a single point, it may occupy different positions within the cross-section of the borehole (250) within a short axial distance. Thus, in a high-level of approximation it may produce a measurement equivalent to that produced by a multiple fiber optic cables disposed at different locations within the cross-section of a borehole (250).

Figure 3:
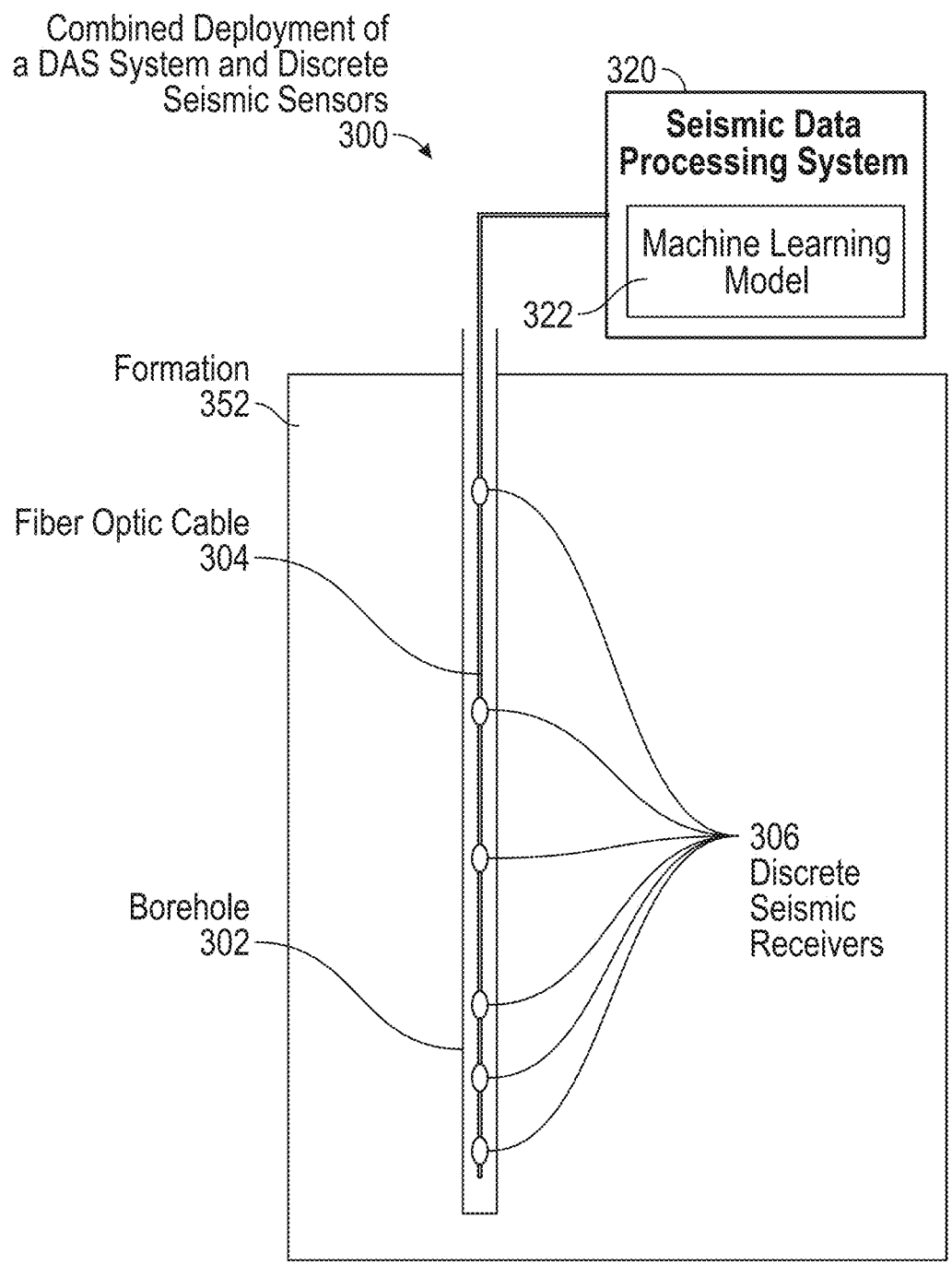
FIG. 3 shows a system combing a fiber optic DAS system with discrete seismic receivers, in accordance with one or more embodiments.

Turning to FIG. 3, an example of a system (300) combing a fiber optic DAS system with discrete seismic receivers, in accordance with one or more embodiments, is shown. A fiber optic cable (304) is disposed in a borehole (302) in a formation (352), as described in reference to FIG. 2B. In addition, discrete seismic receivers (306) are disposed in the borehole (302). The discrete seismic receivers (306) may be located at points along the length of the fiber optic cable (304). For example, multiple discrete seismic receivers (306) may be located at regular or irregular intervals along the length of the fiber optic cable (304).

The discrete seismic receivers (306) may include hydrophones (measuring pressure fluctuations), geophones (measuring particle velocity), accelerometers (measuring particle acceleration), etc. Hydrophones may use piezoelectric materials, or magnetostrictive materials which emit an electrical signal in response to an applied pressure. Geophones typically include a spring-mounted wire coil moving within the field of a permanent magnet. Accelerometers may also be based on a spring-mounted moving coil design, or may piezo-restrictive, or piezo-capacitive designs.

In one or more embodiments, a seismic data processing system (320) collects measurements obtained from the fiber optic cable (304) and the discrete seismic receivers (306). The collected measurements may be used to train a machine learning model (322) to predict high resolution data of particle motion (particle velocity or acceleration) using the measurements obtained from the fiber optic cable (304). In one or more embodiments, the seismic data processing system (320 is a computing system, similar to the computing system of FIG. 7, performing the operations shown in FIG. 5.

The machine learning model (322) may be based on any type of machine learning technique/algorithm. For example, perceptrons, convolutional neural networks, deep neural networks, recurrent neural networks, support vector machines, decision trees, inductive learning models, deductive learning models, supervised learning models, unsupervised learning models, reinforcement learning models, etc. may be used. In some embodiments, two or more different types of machine-learning models are integrated into a single machine-learning architecture, e.g., a machine-learning model may include support vector machines and neural networks.

In some embodiments, various types of machine learning algorithms, e.g., backpropagation algorithms, may be used to train the machine learning model. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model. In some embodiments, historical data, e.g., seismic data recorded over time, may be augmented to generate synthetic data for training the machine learning model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Turning to recurrent neural networks, a recurrent neural network (RNN) may perform a particular task repeatedly for multiple data elements in an input sequence (e.g., a sequence of maintenance data or inspection data), with the output of the recurrent neural network being dependent on past computations. As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks. In some embodiments, a recurrent neural network is trained using a reinforcement learning algorithm such as a deep reinforcement learning algorithm. For more information on reinforcement learning algorithms, see the discussion below.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, etc., may be used. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, one or more ensemble learning methods may be used in connection to the machine-learning models. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

A description of an actual implementation and use of the machine learning model (320) is provided below in reference to FIGS. 4 and 5.

While FIG. 3 shows a configuration of hardware components and/or software components, other configurations may be used without departing from the scope of the disclosure. For example, various components in FIG. 3 may be combined to create a single component. As another example, the functionality performed by a single component may be performed by two or more components.

Figure 4:
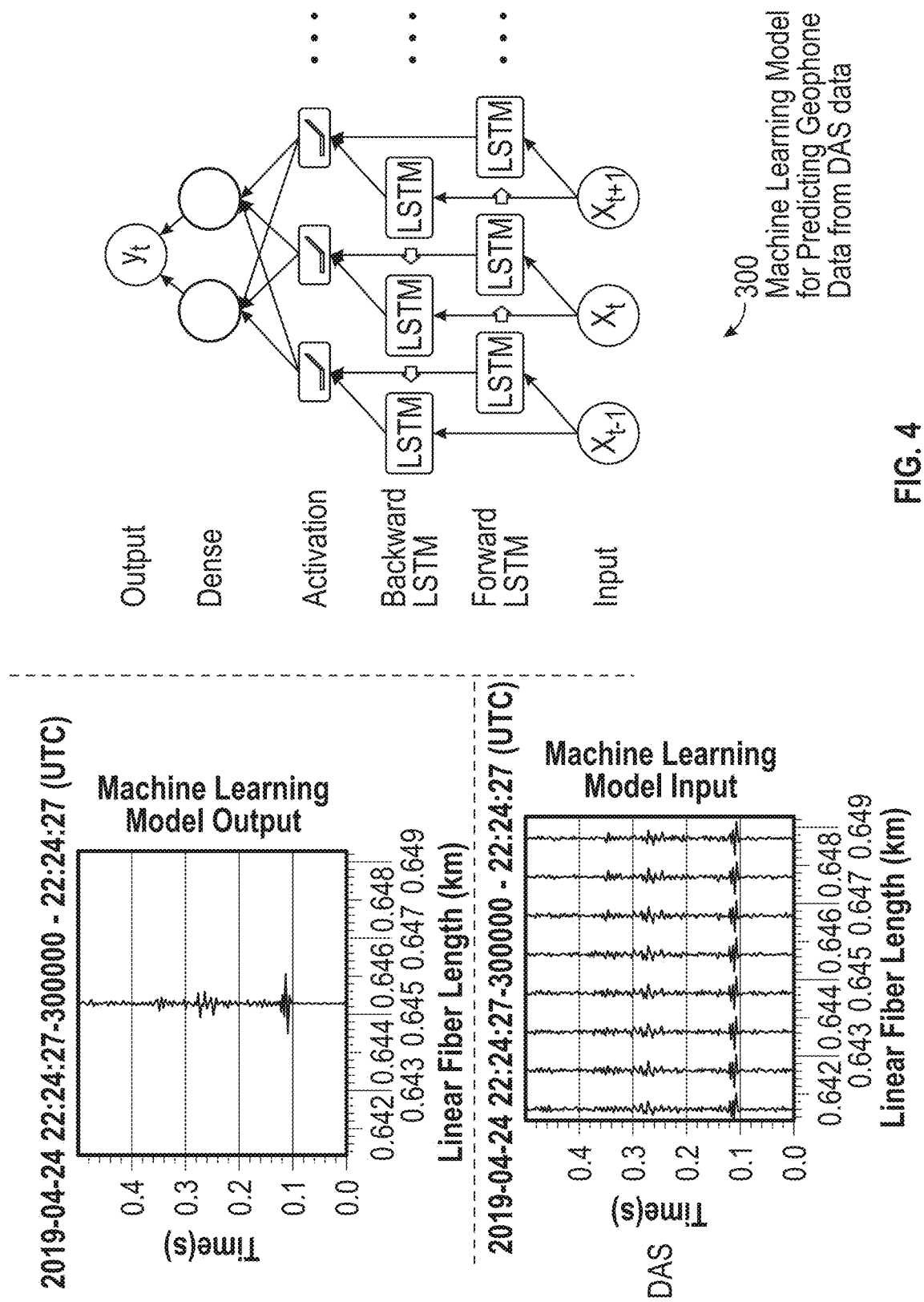
FIG. 4 shows a machine learning model for predicting particle motion from DAS measurements, in accordance with one or more embodiments.

Turning to FIG. 4, a machine learning model (400) predicting particle motion from DAS measurements, in accordance with one or more embodiments, is shown. The machine learning model (400), in the example, is a bidirectional LSTM network. Other types of machine learning models may be used, without departing from the disclosure. In the example, the machine learning model (400) predicts (machine learning output) a vertical component of discrete seismic receiver data (e.g., geophone data) based on eight of the nearest DAS data traces (machine learning model input).

For the layers between the input layer and the output layer, the bidirectional LSTM layer immediately following the input layer consists of both a forward and a backward LSTM layer, which is then followed by an activation layer, before being fed into a fully connected dense layer and combined to produce the output sequence prediction. Once the input and output dimensions are all set, the dimension of each one of the middle network layers are determined accordingly. The activation function may be a ReLU function or any other type of nonlinear functions. Each node in the network model consists of a set of network weight coefficients that may be updated using the gradient back propagation approach as part of the learning processing during training.

The operations performed to make a prediction using the machine learning model (400) are described below. The machine learning model (400) may be generalized to predict discrete seismic receiver data for multiple discrete seismic receivers (e.g., geophones arranged in a vertical column as shown in FIG. 3. Further, other types of data may be predicted. For example, particle acceleration may be predicted in addition to or as an alternative to particle velocity, without departing from the disclosure.

Figure 5:
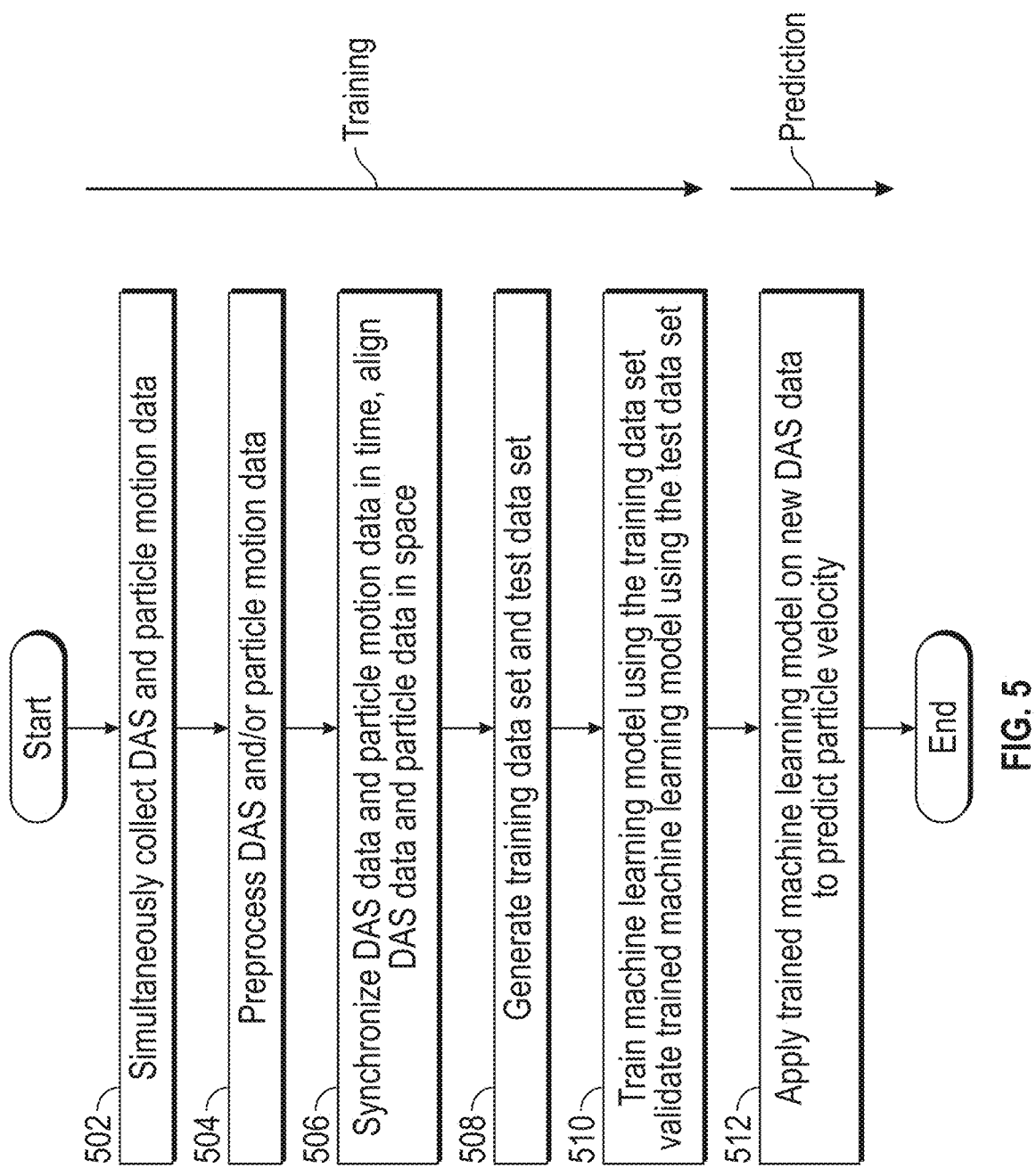
FIG. 5 shows a flowchart of a method for mapping fiber optic DAS measurements to particle motion, in accordance with one or more embodiments.

Turning to FIG. 5, flowchart in accordance with one or more embodiments is shown. The flowchart describes a method for mapping fiber optic DAS measurements to particle motion. One or more blocks in FIG. 5 may be performed using a system as described in FIG. 3. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

The method may be performed to convert DAS measurements into particle velocity or acceleration, compatible with geophone measurements, although the obtained predictions of geophone measurements may have the additional benefit of being at a higher resolution and providing a larger coverage than what is typically feasible using geophones. The method may use a deep learning model, such as the bidirectional Long Short-Term Memory (LSTM) as shown in FIG. 4.

In Block 502, DAS and particle motion data are simultaneously obtained using the previously described configuration of DAS and geophone components in the same well. The well may be permanently or temporarily equipped with a fiber optic cable as previously described. Further, an array of discrete seismic receivers, e.g., a wireline geophone array clamped to the borehole walls at multiple depths may be used. Examples of DAS and particle motion data are provided in FIG. 4.

In Block 504, the DAS and/or the particle motion data are preprocessed. The preprocessing may be performed to ensure that the DAS data and the geophone data are suitable for training the machine learning model. For example, since DAS data collected from straight fiber optic cables is only sensitive to axial deformations (in a vertical direction of the borehole), only the vertical component of the geophone data may be comparable. Geophone data for other degrees of freedom may be removed. Further, a noise-attenuation may be performed to eliminate various types of noise in the DAS data, e.g., bandpass filtering and/or frequency-wavenumber (F-K) filtering. In addition, an inverse instrument response filter may be applied to the particle motion data to reduce or eliminate the effect of the dynamic characteristics of the geophone itself on the particle motion data. A denoising may further be performed to remove random noise bursts occurring predominantly at the start of the recording.

In Block 506, an alignment of the DAS data and the particle motion data are performed in time and/or in space. Unlike the locations of geophones being well-determined, the precise locations of the DAS channels along the well are uncertain. Specifically, the total length of the fiber optic cable may not necessarily be known, and the exact channel spacing within the wellbore may also be unknown. As a result, DAS data may require some acquisition-related calibration to determine the depth of the DAS channels. For example, geophone data acquired from a known depth may be used to calibrate DAS depth. Further, if a constant time shift between the DAS and particle motion data is detected, a calibration of recording time may also be performed to allow for compensation of the constant time shift. Additional operations (e.g., a resampling) may be performed to obtain consistency between the sampling frequencies of DAS data and geophone data. After the processing as described, a trace of DAS data for each of the DAS channels and a trace of particle motion data may be available for further processing.

In Block 508, training and test data sets are generated from the DAS and particle motion data.

A number of DAS data, e.g., k number of traces associated with the DAS channels that are captured closest to a target discrete seismic receiver, are extracted for use as input to predict the target discrete seismic receiver trace. Multiple input DAS traces may be used because, although the DAS channels are relatively dense (and considerably denser than the spacing of the discrete seismic receivers), the discrete seismic receivers are generally not at the exact location as any one of the DAS channels. As a result, in order to predict the particle motion at certain depth, data from several adjacent DAS channels may be used.

Next, discrete seismic receiver data and corresponding DAS data may be separated into training data and test data sets. A random selection may be performed to establish separate training data and test data sets. An 80%/20% ratio of training data vs test data may be used, for example.

Subsequently each data trace in these data sets is partitioned into short time sequences with potential overlaps. The length of the short time sequences may be governed by the length of the input expected by the machine learning model. The length of the time sequences should be sufficient to capture the seismic wave. An example is provided in FIG. 4, where eight traces of DAS data and one trace of discrete seismic receiver data capture the seismic wave. The corresponding sequence lengths for geophone and DAS may be the same or different, as long as the ratio is consistent. The network input and output dimensions may be selected accordingly. Because the DAS data are averaging strain over the selected gauge length, the spatial sampling of DAS channels is correctly comparable to geophones only when the signal wavelengths are large enough to be constant over a gauge length (typically 10 m), whereas discrete seismic receiver data are spatially aliased if signal wavelengths are less than twice the discrete seismic receiver spacing. After completion of the operations of Block 508, a training data set and a test data set are available for training of the machine learning model. The training data set and the test data set may include data associated with any number of seismic events for which the corresponding seismic waves have been recorded.

In Block 510, a training of the machine learning model may be performed using the training data set. Now specifically referring to the example shown in FIG. 4, the k number of DAS training data traces closest to a target geophone trace are chosen as input, partitioned into training sample format as previously described, to serve as input to the machine learning model. The output of the machine learning model is a predicted particle motion. The dimension of the direct input layer of the machine learning model is of K×N, where K is the number of input DAS traces, and N is the segment length. The dimension of the output layer is M where M is the output sequence length. In the case where the input and output sequence samples are equal, N=M. However, N does not have to be the same as M, particularly in cases where DAS and the discrete seismic receiver have very different sampling frequencies.

As previously noted, the performance of the machine learning model may be measured using the root mean squared error (RMSE) between the measured and the predicted discrete seismic sensor data. The RMSE obtained by performing a validation using the test data may be used to assess the performance of the machine learning model. The machine learning model with the best performance may be selected for future use. This may conclude the training of the machine learning model.

In Block 512, the trained machine learning model is used on new DAS data that have been partitioned and formatted similar to those of the training sample data sets. The trained machine learning model provides predicted particle motions, based on the new DAS data. The trained machine learning model may be used to perform predictions using the DAS data associated with the DAS channels that were initially used for the training of the machine learning model. The trained machine learning model may also be used to perform predictions for other DAS channels, e.g., DAS channels adjacent to the DAS channels used for the training. As a result, the trained machine learning model may provide a higher spatial resolution than what would be available from discrete seismic receivers. Specifically, while the training was performed at locations where discrete seismic receiver data are available, the trained machine learning model may also make predictions for other locations, e.g., between discrete seismic receivers.

While the method of FIG. 5 is described based on a machine learning model that is based on a bidirectional LSTM, other machine learning models may be used, without departing from the disclosure.

The following is an example demonstrating an application of the system and method as described for mapping fiber optic DAS data into particle motion.

Figure 6A:
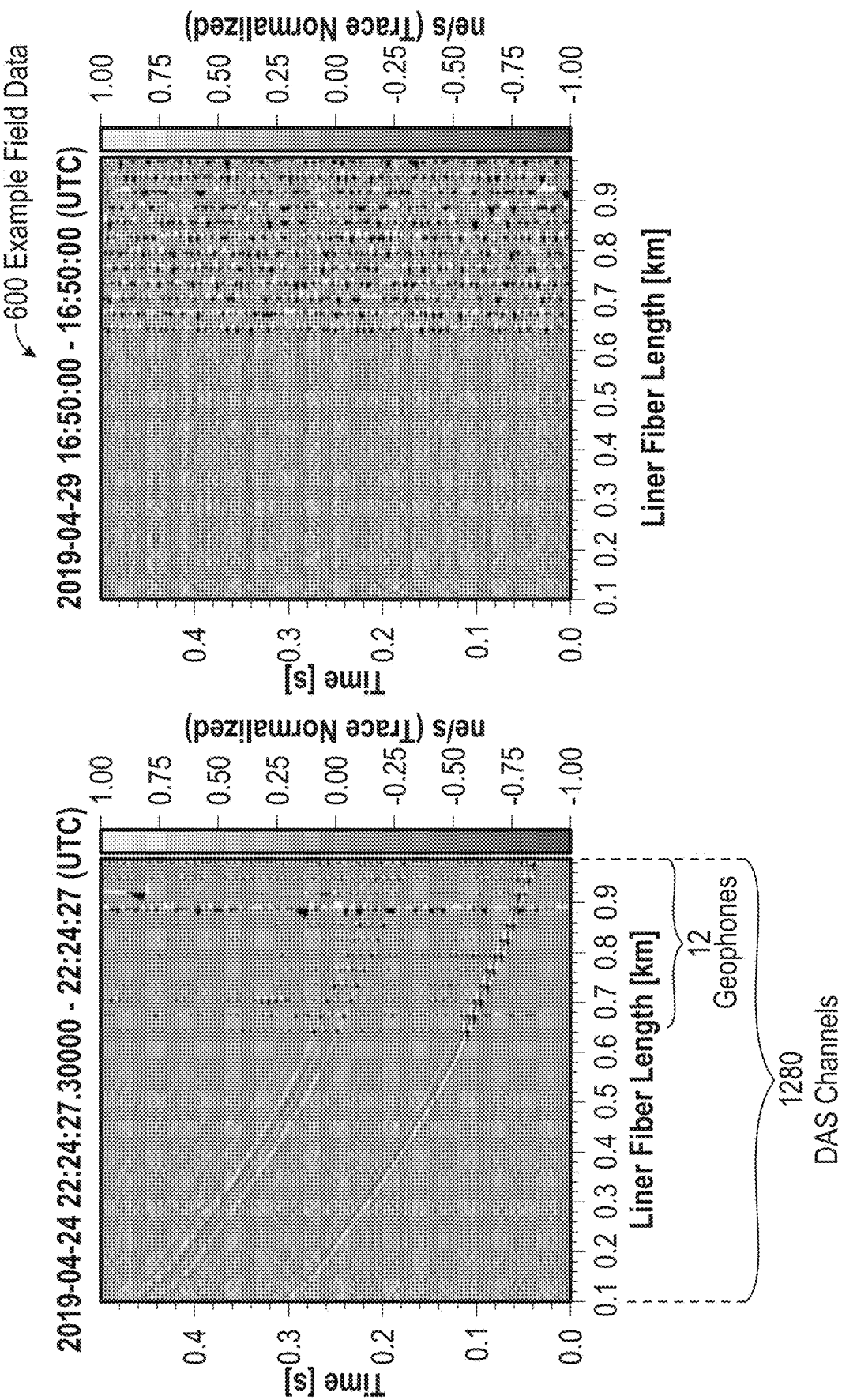
FIG. 6A shows sample field data, in accordance with one or more embodiments.

Turning to FIG. 6A, sample field data (600), in accordance with one or more embodiments, are shown. In the example, a total of twelve (12) geophones were placed at different depth with a spacing of 31 m. The fiber optic cable provided a total of 1280 DAS channels with a spacing of 1.02 m. The time sample rate of both the DAS and the geophone data was 0.5 ms. The fiber optic DAS gauge length was Two example subsets of the geophone and the DAS data are shown in the left and right panel of FIG. 6A, respectively, with different signal versus noise ratio levels. In each plot the geophone traces are overlaid on top of the DAS trace plots.

Figure 6B:
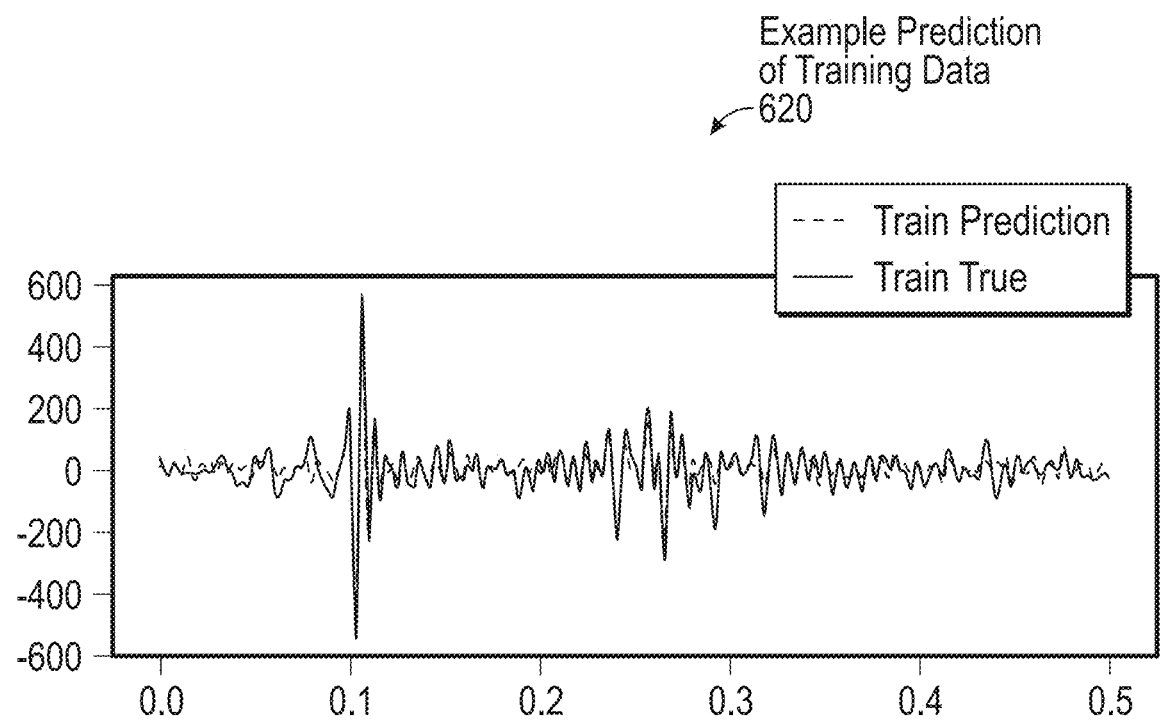
FIGS. 6B and 6C show sample predictions, in accordance with one or more embodiments.
Figure 6C:
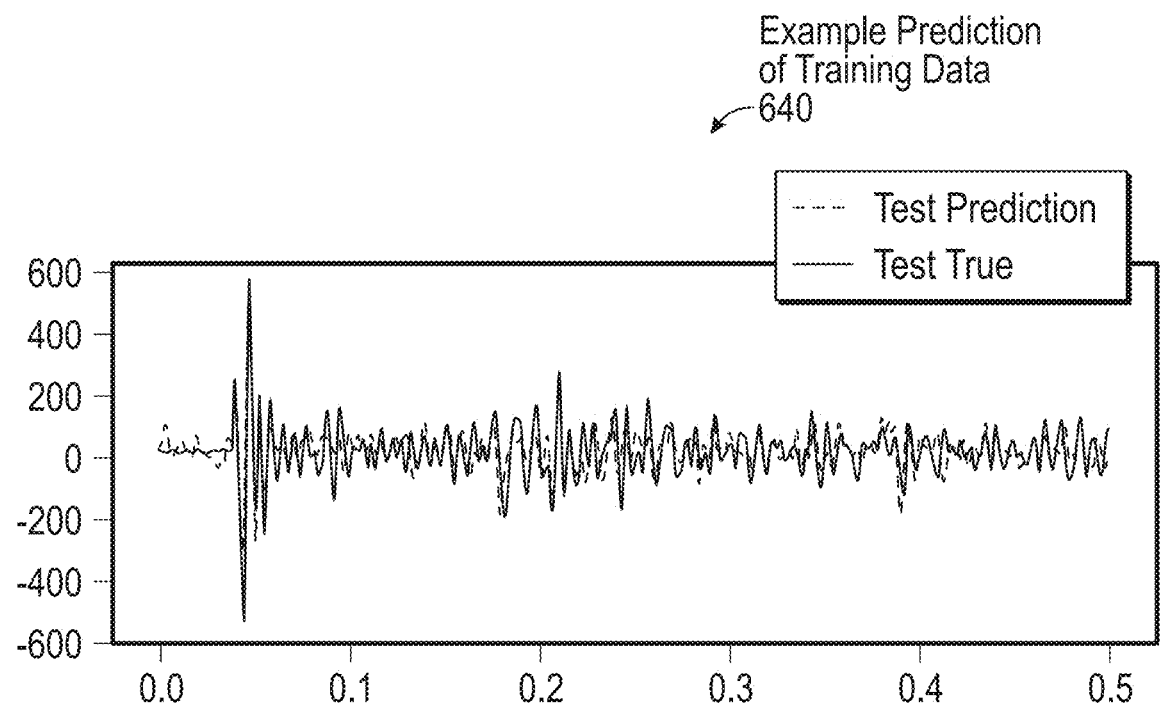

FIG. 6B shows a prediction of the training data (620), whereas FIG. 6C shows a prediction of the test data (640), after 100 epochs (training). The predicted geophone data accurately match the measured geophone data in the training data set (FIG. 6B), and match very well in the testing case (FIG. 6C).

Figure 7:
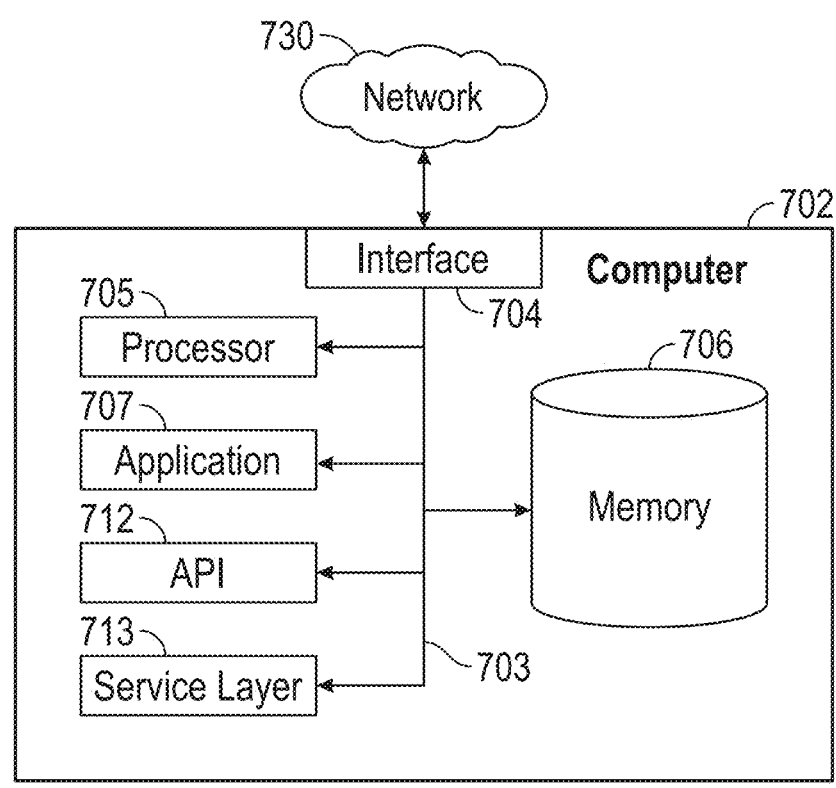
FIG. 7 shows a computer system in accordance with one or more embodiments.

Embodiments may be implemented on a computer system. FIG. 7 is a block diagram of a computer system (702) used to provide computational functionalities associated with described algorithms, methods, functions, processes, flows, and procedures as described in the instant disclosure, according to an implementation. For example, the seismic data processing system (320) may be implemented on computer system (702). The illustrated computer (702) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704 includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), each computer (702) communicating over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

In some embodiments, the computer (702) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method for mapping fiber optic distributed acoustic sensing (DAS) measurements to particle motion data, the method comprising:
   obtaining, from a fiber optic DAS system in a wellbore, a first set of DAS data associated with a first seismic wave;
   obtaining, from a discrete seismic receiver in the wellbore, measured particle motion data associated with the first seismic wave, wherein the measured particle motion data comprises electrical signal measurements generated by the discrete seismic receiver;
   generating training data from the first set of DAS data and the measured particle motion data;
   training a machine learning model using the training data;
   obtaining a second set of DAS data associated with a second seismic wave;
   generating predicted particle motion data in response to the second seismic wave using the machine learning model applied to the second set of DAS data, wherein the predicted particle motion data is formatted as electrical signal measurements generated by the discrete seismic receiver; and
   inputting the predicted particle motion data to a seismic inversion workflow to determine formation characteristics near the wellbore.

2. The method of claim 1, wherein the machine learning model is a long short-term memory (LSTM) network.

3. The method of claim 2, wherein the LSTM network comprises a bidirectional LSTM layer.

4. The method of claim 1, wherein the measured particle motion is one selected from a group consisting of a velocity and an acceleration.

5. The method of claim 1, wherein the first set of DAS data is for a plurality of DAS channels simultaneously recorded in spatial proximity to the discrete seismic receiver.

6. The method of claim 1, wherein the discrete seismic receiver is a geophone.

7. The method of claim 1, further comprising, prior to training the machine learning model:
   temporally aligning the first set of DAS data and the particle motion data.

8. The method of claim 1,
   wherein the first set of DAS data is obtained from a first set of DAS channels of the fiberoptic DAS system, wherein the second set of DAS data is obtained from a second set of DAS channels of the fiberoptic DAS system, different from the first set of DAS channels.

9. A system for mapping fiber optic distributed acoustic sensing (DAS) measurements to particle motion data, the system comprising:
a seismic data processing system configured to:
obtain, from a fiber optic DAS system in a wellbore, a first set of DAS data associated with a first seismic wave;
obtain, from a discrete seismic receiver in the wellbore, measured particle motion data associated with the first seismic wave, wherein the measured particle motion data comprises electrical signal measurements generated by the discrete seismic receiver;
generate training data from the first set of DAS data and the measured particle motion data;
train a machine learning model using the training data;
obtain a second set of DAS data associated with a second seismic wave;
generate predicted particle motion data in response to the second seismic wave using the machine learning model applied to the second set of DAS data, wherein the predicted particle motion data is formatted as electrical signal measurements generated by the discrete seismic receiver; and
input the predicted particle motion data to a seismic inversion workflow to determine formation characteristics near the wellbore.

10. The system of claim 9, further comprising:
the fiber optic DAS system.

11. The system of claim 9, further comprising:
the discrete seismic receiver.

12. The system of claim 9, wherein the discrete seismic receiver is a geophone.

13. The system of claim 9, wherein the machine learning model is a long short-term memory (LSTM) network.

14. The system of claim 13, wherein the LSTM network comprises a bidirectional LSTM layer.

15. The system of claim 9, wherein the measured particle motion is one selected from a group consisting of a velocity and an acceleration.

16. The system of claim 9, wherein the first set of DAS data is for a plurality of DAS channels simultaneously recorded in spatial proximity to the discrete seismic receiver.

17. The system of claim 9, wherein the seismic data processing system is further configured to, prior to training the machine learning model:
temporally align the first set of DAS data and the particle motion data.

18. The system of claim 9,
wherein the first set of DAS data is obtained from a first set of DAS channels of the fiberoptic DAS system,
wherein the second set of DAS data is obtained from a second set of DAS channels of the fiberoptic DAS system, different from the first set of DAS channels.

19. A non-transitory machine-readable medium comprising a plurality of machine-readable instructions executed by one or more processors, the plurality of machine-readable instructions causing the one or more processors to perform operations comprising:
obtaining, from a fiber optic distributed acoustic sensing (DAS) system in a wellbore, a first set of DAS data associated with a first seismic wave;
obtaining, from a discrete seismic receiver in the wellbore, measured particle motion data associated with the first seismic wave, wherein the measured particle motion data comprises electrical signal measurements generated by the discrete seismic receiver;
generating training data from the first set of DAS data and the measured particle motion data;
training a machine learning model using the training data;
obtaining a second set of DAS data associated with a second seismic wave;
generating predicted particle motion data in response to the second seismic wave using the machine learning model applied to the second set of DAS data, wherein the predicted particle motion data is formatted as electrical signal measurements generated by the discrete seismic receiver; and
inputting the predicted particle motion data to a seismic inversion workflow to determine formation characteristics near the wellbore.

20. The non-transitory machine-readable medium of claim 19,
wherein the first set of DAS data is obtained from a first set of DAS channels of the fiberoptic DAS system,
wherein the second set of DAS data is obtained from a second set of DAS channels of the fiberoptic DAS system, different from the first set of DAS channels.

* * * * *